United States Patent [19]
Cronch et al.

[11] Patent Number: 5,146,372
[45] Date of Patent: Sep. 8, 1992

[54] ADAPTIVE WINDOW CENTERING

[75] Inventors: Robert Cronch; Mark D. Hertz; Hieu V. Nguyen, all of Oklahoma City, Okla.

[73] Assignee: Seagate Technology, Inc., Scotts Valley, Calif.

[21] Appl. No.: 540,099

[22] Filed: Jun. 19, 1990

[51] Int. Cl.5 .............................. G11B 5/09
[52] U.S. Cl. ........................ 360/51; 360/46
[58] Field of Search ............ 360/51, 46, 53, 39

[56] References Cited

U.S. PATENT DOCUMENTS 4,809,088  2/1989  Lafgren et al. ............... 360/51
4,958,243  9/1990  Chen et al. ................... 360/51

Primary Examiner—Vincent P. Canney
Attorney, Agent, or Firm—Kinney & Lange

[57] ABSTRACT

Window center settings in a read channel of a magnetic disk drive are controlled. The magnetic disk drive is suitable for reading data from a magnetic disk. A number of read operations are performed and data is read from the magnetic disk. Read errors are detected during the read operations. The number of read errors is recorded and error types are determined. Adjustment of the window center settings is controlled based on the number of read errors detected and the error types determined.

34 Claims, 9 Drawing Sheets

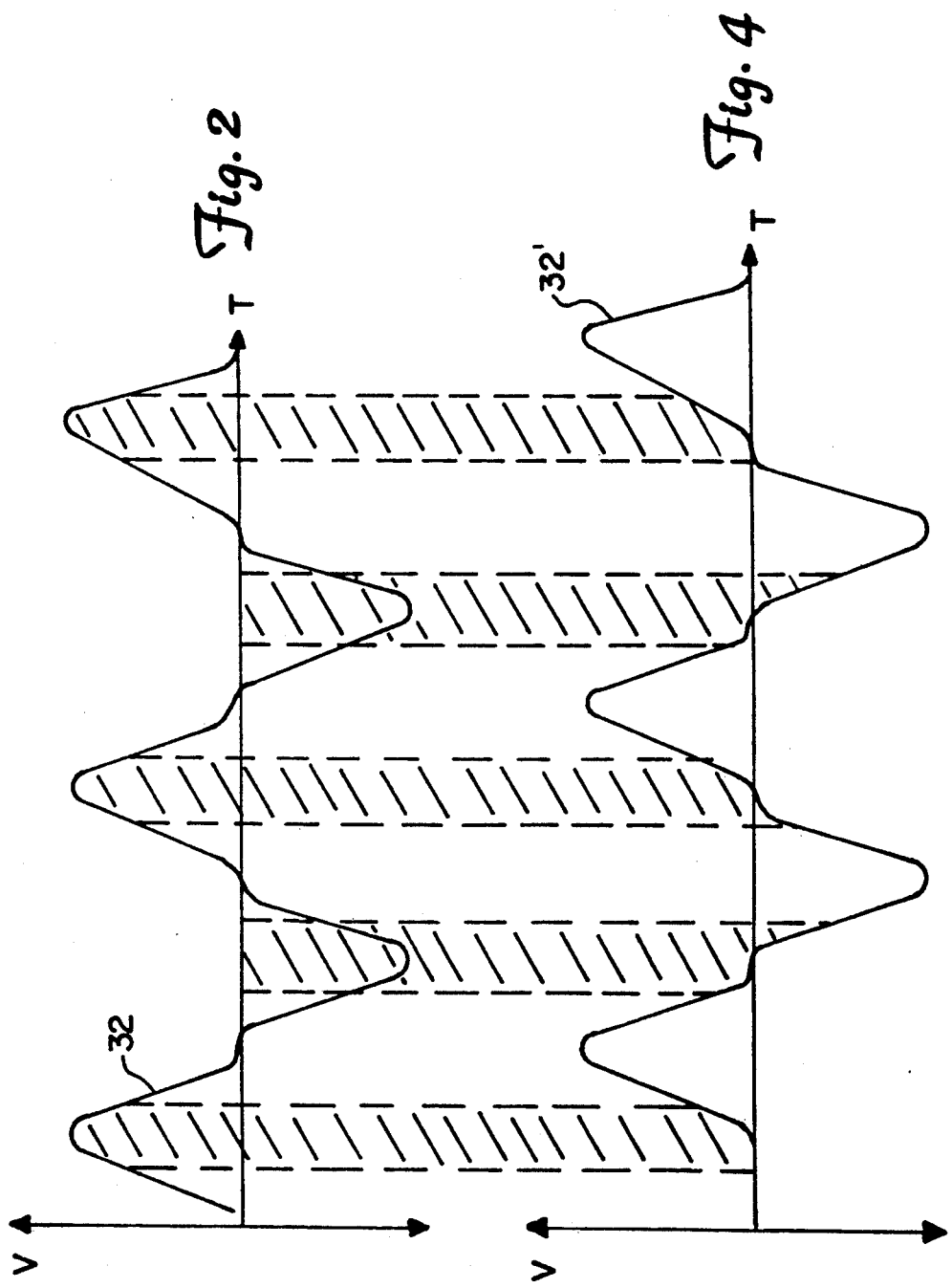

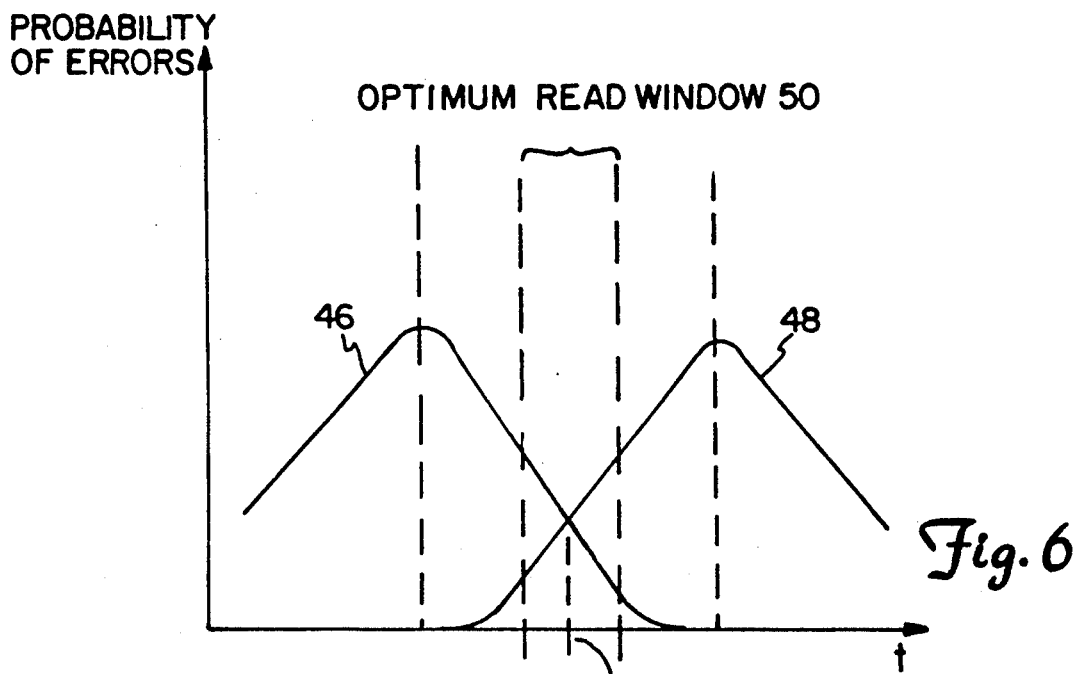

ADAPTIVE WINDOW CENTERING

BACKGROUND OF THE INVENTION

The present invention deals with reading data from a magnetic disk. More particularly, the present invention deals with adjusting window center settings in a read channel of a magnetic disk drive A magnetic disk, such as one used in a computer disk drive, is a flat circular platter with a magnetic surface. Data is stored on the magnetic surface by selective polarization of portions of the magnetic surface. The presence or absence of polarity transitions between the polarized portions represents particular binary values. Typically, the magnetically polarized portions are arranged in a plurality of radially concentric tracks on the magnetic surface to aid in location and read back of the data.

In order to read back the data recorded on the magnetic surface, a magnetic transducer moves relative to the magnetic disk along a given track. The magnetic transducer generates an electrical signal (the "read signal"), which represents the states of polarization encountered along the track. Pulses in the read signal correspond to the magnetically polarized portions of the magnetic disk.

Ideally, the read signal would not be influenced by any factors other than the magnetically polarized portions. However, other factors do influence the read signal and must be taken into account in processing the read signal.

During processing of the read signal, the processing logic (i.e. the read chain logic) is configured to recover data from the read signal during a certain period in time known as a read window. The read window represents the time during which the pulses in the read signal, which represent digital data stored on the magnetic disk, are valid. However, the actual window during which the pulses are valid can shift in time due to aging of the circuitry in the magnetic disk drive. Also, as the circuitry heats up during operation, the temperature differential can cause the read window to shift. Further, the optimum read window can shift due to process changes in the magnetic disk drive or due to part-to-part timing variation in the read chain circuitry of the magnetic disk drive.

SUMMARY OF THE INVENTION

The present invention is a technique of adjusting a window center setting in a read chain of a magnetic disk drive. A number of read operations are performed by the magnetic disk drive to read data from a magnetic disk. A number of read errors are detected during the read operations and error types are determined. Adjustment of the window center settings in the read chain is controlled based on the number of errors detected and the types of errors determined.

BRIEF DESCRIPTION OF THE DRAWINGS

FIG. 2 is a wave form representing a magnetic transducer-generated read signal.

FIG. 4 is a wave form representing a magnetic transducer-generated read signal which is shifted in time with respect to the wave form shown in FIG. 2.

FIG. 6 is a graph showing a probability of the occurrence of Shift Right or Shift Left errors plotted against time.

FIG. 7 shows a portion of a transducer-generated read signal.

DETAILED DESCRIPTION OF THE PREFERRED EMBODIMENTS

Figure 1A:
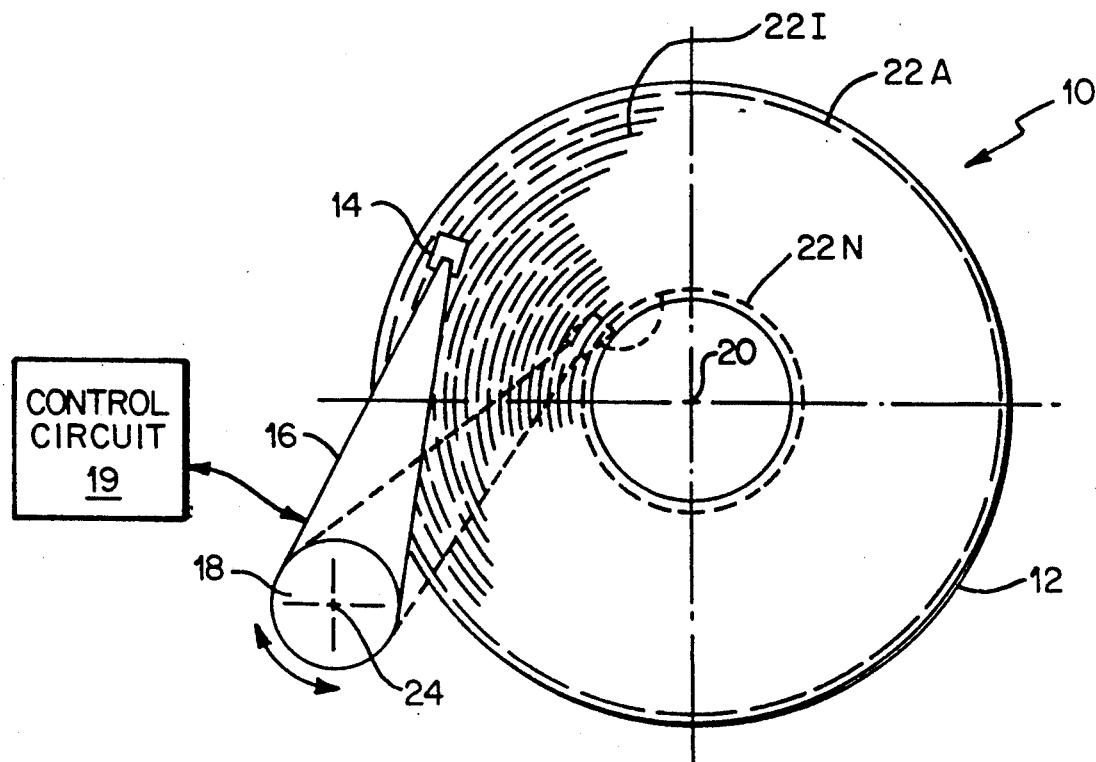
FIG. 1A is a plan view of a conventional disk drive.

FIG. 1A illustrates a portion of a magnetic disk drive 10. Disk drive 10 includes magnetic disk 12, slider 14, actuator arm 16, rotary actuator 18, and control circuit 19. Although disk drive 10 is shown with only a single magnetic disk 12, it will be understood by those skilled in the art that the present invention is applicable to disk drives including a plurality of magnetic disks.

Magnetic disk 12 is mounted for rotation on a spindle centered on axis 20. Data blocks are arranged on magnetic disk 12 in a plurality of radially concentric tracks 22A–22N. Data tracks 22A and 22N are the outermost and innermost data tracks, respectively, on magnetic disk 12.

Figure 1B:
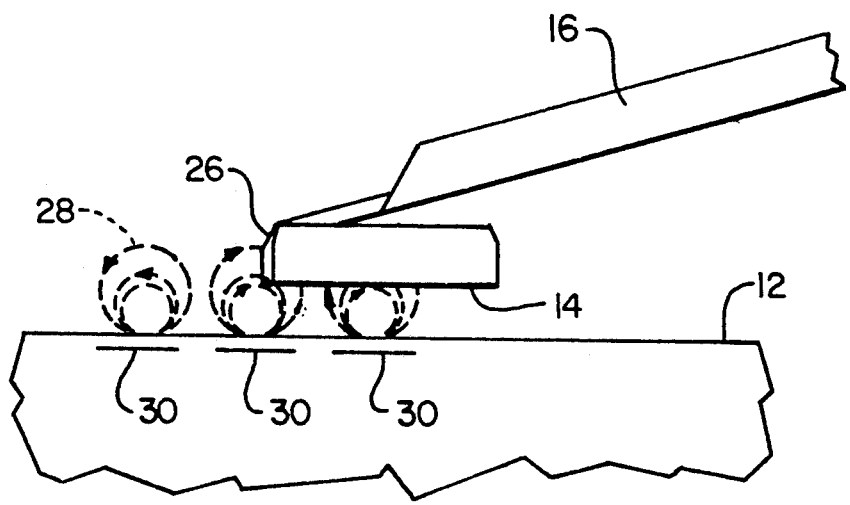
FIG. 1B is a partial cross sectional view of the conventional disk drive shown in FIG. 1A.

Slider 14 carries a magnetic transducer (transducer 26 shown in FIG. 1B). As magnetic disk 12 rotates, slider 14 flies just over the surface of magnetic disk 12 Slider 14 is attached to actuator arm 16, which is, in turn, attached to rotary actuator 18. Actuator arm 16 is mounted for rotation about axis 24 of rotary actuator 18. As slider 14 flies above the surface of magnetic disk 12, control circuit 19 controls rotary actuator 20 to position slider 14 over a selected data track, for example, track 22I. If a plurality of magnetic disks were used, control circuit 19 would be programmed to select the appropriate disk to be read from and written to.

FIG. 1B shows a portion of a sectional view of disk drive 10. Magnetic transducer 26 is mounted on a face of slider 14 which is perpendicular to the surface of magnetic disk 12. As transducer 26 flies over magnetic disk 12, transducer 26 senses magnetic flux lines 28 emitted from polarized portions 30 of magnetic disk 12. Magnetic transducer 26 generates a read signal which is characterized by positive going or negative going transitions in pulses associated with the flux reversals of flux lines 28 emitted by polarized portions 30. Read signal 32 is demodulated and data is recovered from read signal 32 by control circuit 19.

FIG. 2 shows a graph of a read signal 32 generated by transducer 26. The positive and negative going transitions of read signal 32 correspond to the flux reversals of flux lines 28 emitted by polarized portions 30 of magnetic disk 12.

Figure 3:
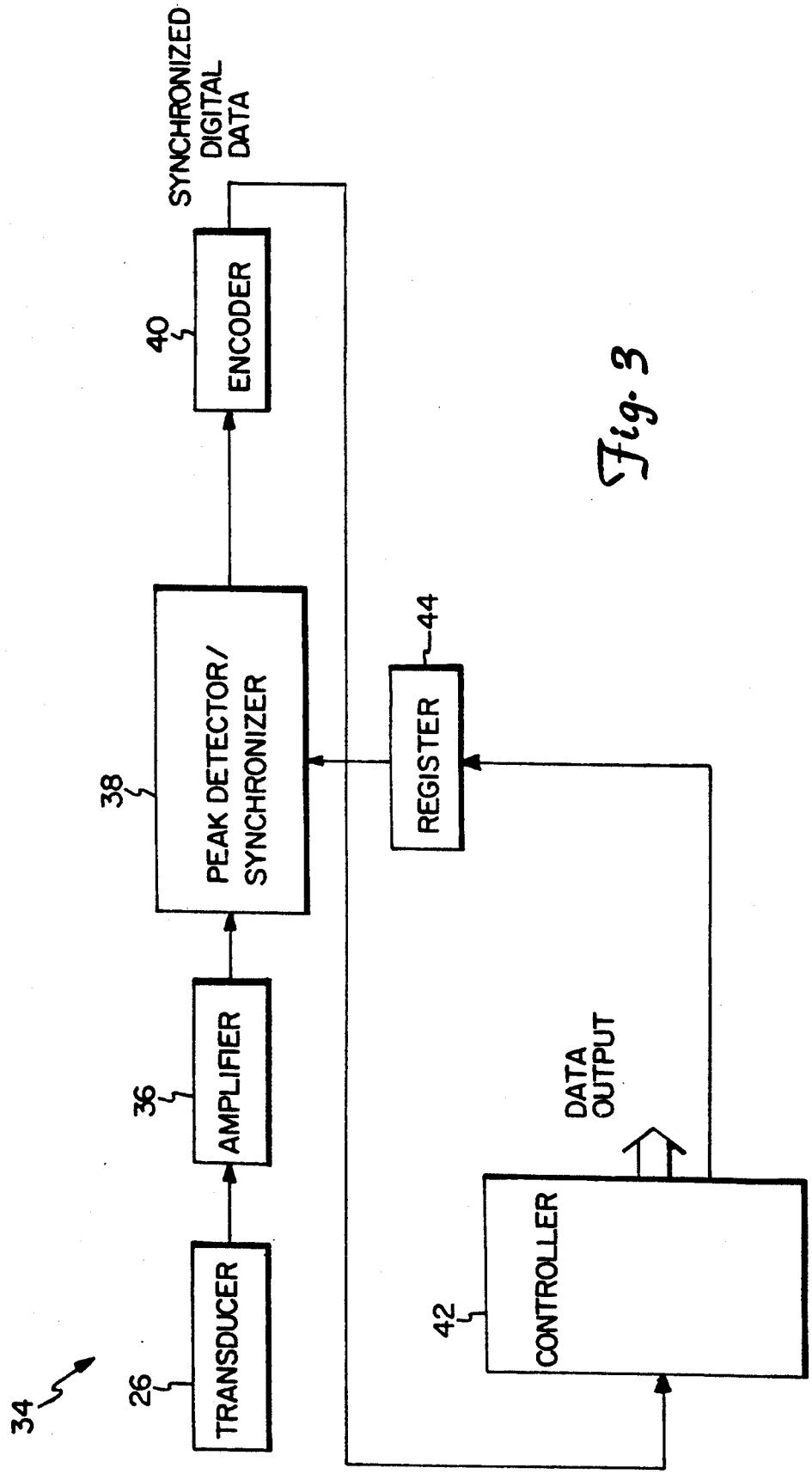
FIG. 3 is a block diagram of a read chain.

FIG. 3 shows a block diagram of a read chain 34 in disk drive 10. Read chain 34 includes transducer 26, amplifier 36, peak detector/synchronizer 38, encoder 40, controller 42 and register 44. Transducer 26 provides read signal 32 to amplifier 36. Typically, amplifier 36 is an automatic gain control amplifier. Amplifier 36 amplifies read signal 32 and provides the amplified signal to peak detector/synchronizer 38. Peak detector/synchronizer 38 detects the peaks in read signal 32 and synchronizes data pulses, representative of those peaks, with a system reference clock.

In detecting the peaks of read signal 32, peak detector/synchronizer 38 "looks" for the peaks during a time period known as the read window. Data is recovered from read signal 32 by determining whether read signal 32 passes above or below a qualification threshold during the read window. Therefore, the read window would be ideally centered around the peaks of read signal 32. If it is not, peak detector/synchronizer 38 may not detect a proper peak and a read error will occur.

Peak detector/synchronizer 38 provides output data, recovered from read signal 32, to encoder 40. Encoder 40 encodes the data into synchronized digital data and provides it to controller 42.

During a read operation, controller 42 receives the synchronized digital data provided by encoder 40 and processes the data by either providing it to, for example, a host computer (not shown) or by performing certain operational steps based on the digital data.

In this preferred embodiment, controller 42 also detects read errors which occur during the read operation. Read errors can be determined in several ways. In this preferred embodiment, a prestored location on magnetic disk 12, such as track 22I or a portion of track 22I, is prewritten with data. During operation of the magnetic disk drive 10, the prestored location is periodically read and read errors are recorded.

Read errors can take many forms including time shift errors (e.g. Shift Left or Shift Right read errors). Such read errors can affect the time position of the optimum read window. Based on these read errors, controller 42 provides a window center setting to register 44. Register 44, in turn, provides the window center setting to peak detector/synchronizer 38. The window center setting provided by register 44 causes peak detector/synchronizer 38 to reconfigure itself so the read windows such as those shown as cross hatched areas in FIGS. 2 and 4, are repositioned to be properly centered around the peaks in the read signal.

The type of read error which causes controller 42 to adjust the window center settings in register 44 vary. For example, FIG. 4 shows a read signal 32' which corresponds to read signal 32 shown in FIG. 2 in all respects except that it is shifted to the right in time with respect to read signal 32. Many things can cause such a shift as that shown in FIG. 4. For example, where magnetic disk drive 10 includes a plurality of magnetic disks, each having an associated slider and transducer, the delay times can vary from disk to disk and transducer to transducer. Also, as magnetic disk drive 10 operates, the electronic components heat up. This temperature variation can cause time shifts in read chain 34. In addition, voltage variations and component-to-component variations in the read circuitry can cause time shifting of the read signal. Further, process or part changes in magnetic disk drive 10 can cause time shifting.

When such a time shift occurs in read signal 32', time shift read errors (such as Shift Left or Shift Right read errors) occur. For example, where read window settings are set for peak detector/synchronizer 38 to those shown as cross hatched windows in FIG. 2, and which are ideally centered around the peaks of read signal 32, they are not properly set when a time shift results in read signal 32' shown in FIG. 4. If such a shift occurs, and the read window is not correspondingly reset, peak detector/synchronizer 38 will be incapable of recovering data from read signal 32' properly. Thus, adjustment of the window center settings in register 44 is required.

COARSE TUNING

Figure 5:
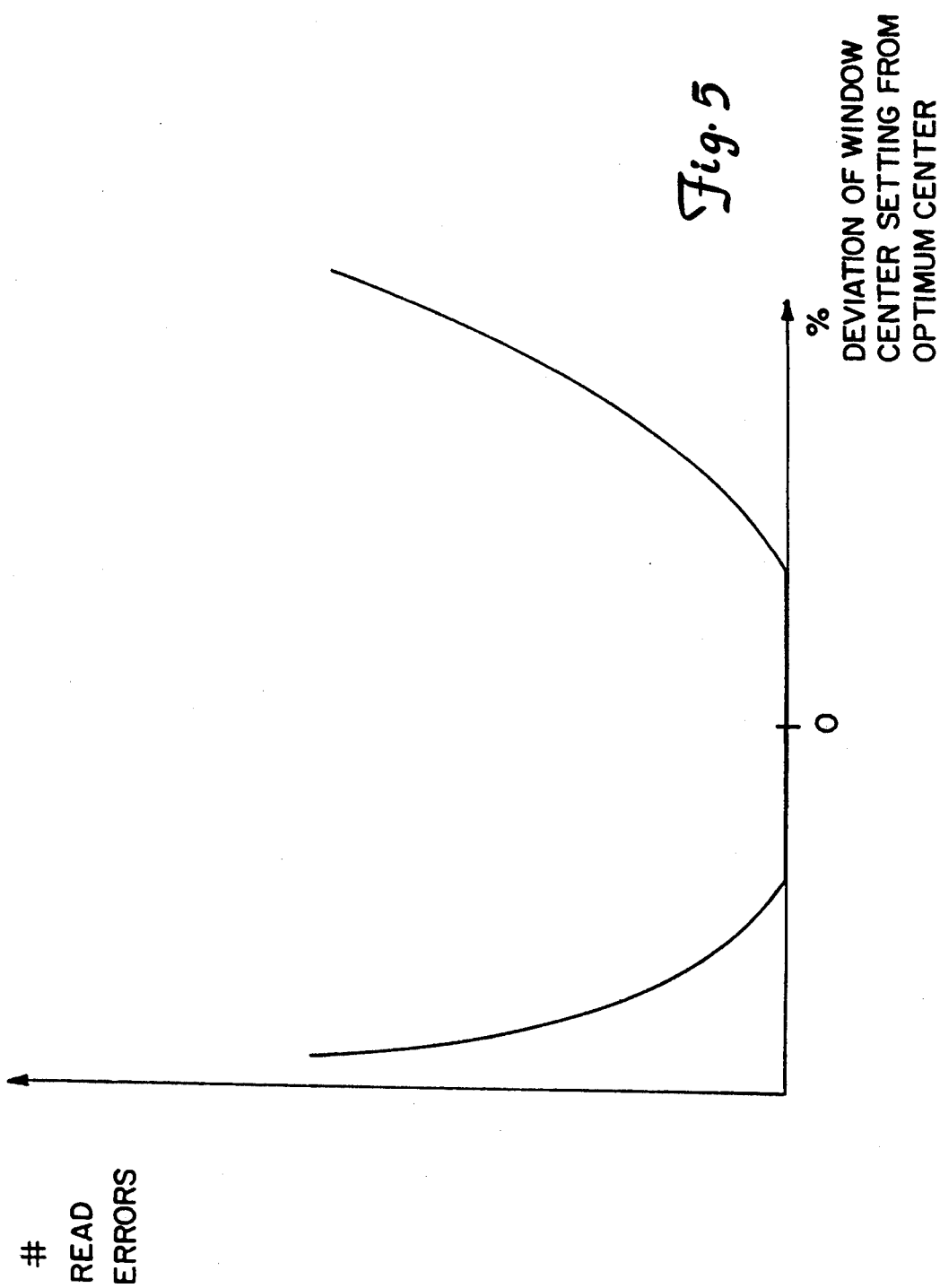
FIG. 5 is a graph showing a number of read errors plotted against percent deviation of window center setting from optimum center setting.

FIG. 5 is a graph showing the number of read errors plotted against the percent deviation of the window center setting for peak detector/synchronizer 38 in register 44 from the window center which would be ideal for read signal 32. FIG. 5 shows that, as the window center setting deviates to the right of the optimum window center (which is represented by 0% deviation), the number of read errors detected stays at a minimal level for a certain amount of time and then begins to rise. Thus, it is apparent that, as the window center setting deviates from the optimal window center, but as long as the setting is within the optimal read window, the error rate does not increase greatly.

However, the further the window center setting deviates from the optimal setting, the greater the number of read errors.

The curve shown in FIG. 5 can be determined by setting the window center setting for peak detector/synchronizer 38 to a nominal level and then performing read operations by reading data from magnetic disk 12. Each time a read error is detected, the error is recorded. After a given number of read operations are performed, the window center setting in register 44 is set to shift the window center setting to the right by a given percent. Then, more read operations are performed and the number of read errors detected is recorded. This is repeated until a threshold number of errors are detected for any given window center setting. Then, the window center setting in register 44 is set back to the nominal value and moved to the left in a step wise fashion. By accumulating the number of read errors detected at each window center setting, the curve in FIG. 5 is determined. Thus, the read window for read chain 34 can be roughly determined.

However, it is also desirable to know, as closely as possible, the exact center point within the read window. If the exact center point is known, the window center setting in register 44 can be set to the appropriate value for optimum operation.

FINE TUNING

A technique of fine tuning the window center settings is used to set the window center setting to the optimum center position within the read window. When data is read from the track, controller 42 accumulates a number of Shift Left read errors and a number of Shift Right read errors detected during the read operations.

In a 2,7 encoded bit stream, a Shift Left error is the result of an asserted bit in the 2,7 encoded bit stream being deasserted and the next bit to the immediate left being asserted. A Shift Left error represents a read errors that occurs as a result of the read window center setting being shifted to the left of the optimal setting.

In addition to Shift Left errors, Shift Left Many errors are also accumulated in controller 42. Shift Left Many errors also result from the read window settings being set earlier than the optimal read window. Shift Left Many errors are the result of an asserted bit in the 2,7 bit stream having been deasserted and a previous bit (more than 1 bit to the left) being asserted For example, in a sample 2,7 encoded bit stream:

100010010000010.

Shift Left and Shift Left Many errors are shown in Table 1.

TABLE 1

| Shift Left Errors | Number of Shifts |
|---|---|
| 100100010000010 | 1 |
| 101000010000010 | 2 |
| 110000010000010 | 3 |
| 100010100000010 | 1 |
| 100011000000010 | 2 |
| 100010010000100 | 1 |
| 100010010001000 | 2 |
| 100010010010000 | 3 |
| 100010010100000 | 4 |
| 100010011000000 | 5 |

Shift Right errors have similar characteristics to Shift Left errors except that they result from the read window settings being set later in time than an optimal read window. A Shift Right Once error is the result of an asserted bit in a 2,7 encoded bit stream having been deasserted while the adjacent bit to the right has been asserted. Similarly, Shift Right Many errors are the result of a read window center setting being set further to the right than the optimum setting. Shift Right Many errors occur when an asserted bit in the 2,7 encoded bit stream is deasserted while a bit greater than one bit to the right is asserted. For example, in a sample 2,7 encoded bit stream:

100010010000010.

Shift Right and Shift Right Many errors are shown in Table 2.

TABLE 2

| Shift Right Errors | Number of Shifts |
|---|---|
| 010010010000010 | 1 |
| 001010010000010 | 2 |
| 000110010000010 | 3 |
| 100001010000010 | 1 |
| 100000110000010 | 2 |
| 100010001000010 | 1 |
| 100010000100010 | 2 |
| 100010000010010 | 3 |
| 100010000001010 | 4 |
| 100010000000110 | 5 |
| 100010010000001 | 1 |

FIG. 6 shows a curve 46 representing the probability that a Shift Left error will occur during a read operation, and a curve 48 representing the probability that a Shift Right error will occur during a read operation. Curves 46 and 48 are shown in relation to the optimum read window 50 and the optimum window center setting 52. FIG. 6 shows that, as the window center setting moves to the right of the optimum window center setting 52, the probability that a Shift Right error will occur during a read operation increases along Gaussian distribution 48. Similarly, as the window center setting moves to the left with respect to the optimum window center setting 52, the probability that a Shift Right error will occur decreases as the probability that a Shift Left error increases along Gaussian distribution 46.

FIG. 6 also shows that, where curves 46 and 48 intersect (where the probability that a Shift Left error will occur equals the probability that a Shift Right error will occur) corresponds to the precise center of optimum read window 50 and optimum window center setting 52. Hence, if the number of read operations performed, the number of Shift Right errors that occur and the number of Shift Left errors that occur, are accumulated, then the probability that a Shift Left error will occur and the probability that a Shift Right error will occur can be determined. Also, the optimum window center setting 52 can be achieved by varying the window center setting until the probability that a Shift Left error will occur equals the probability that a Shift Right error will occur.

FIG. 7 shows the relationship between optimum window center setting 52, as determined from curves 46 and 48, as well as optimum read window 50, and one peak of read signal 32.

In this preferred embodiment, before the window center setting is changed, controller 42 is required to reach a certain confidence level that a change is required. In other words, the window center setting will only be adjusted when controller 42 reaches a certain confidence level that the probability of one type of error occurring is above or below 0.5. Then, controller 42 will adjust the window center setting in the direction of the lower of the two probabilities to equalize the probability of both error types.

The confidence level determined by controller 42 is directly related to the number of samples read from magnetic disk 12. To obtain a threshold confidence level, a certain number of samples must be taken. In this preferred embodiment, a minimum threshold number of errors must occur before controller 42 will do any further processing to determine adjustment to the window center setting. Using the binomial distribution for probability of an event happening in a random sequence, the probability of a certain number of Shift Right errors happening is determined as follows:

$$P(r) = \binom{n}{r} \cdot P(r)^r \cdot P(l)^{(n-r)}$$ Eq. 1 where P(r) the probability of a certain number of Shift Right errors happening;
P(l)=the probability of a certain number of Shift Left errors happening;
r=total number of Shift Right errors recorded;
l=total number of Shift Left errors recorded; and
n=total number of errors (r+l) recorded.

Also, $$P(l) = \binom{n}{l} \cdot P(r)^{(n-l)} \cdot P(l)^l$$ Eq. 2

Assuming, nominally, that P(r)=P(l)=0.5, then:

$$P(r) = \left(\frac{n!}{(r!)(n-r)!}\right) \cdot \left(\frac{1}{2^r}\right)\left(\frac{1}{2^l}\right) = \left(\frac{n!}{r!l!}\right)\left(\frac{1}{2^n}\right)$$ Eq. 3

If, during the read operations, only one error type is detected (e.g. a Shift Right error), then, using Eq. 3, the following table is generated.

TABLE 3

| n | r | P(l ≧ r) | Confidence level (%) that P(r) > 0.5 |
|---|---|---|---|
| 1 | 1 | 0.5 | 50% |
| 2 | 2 | 0.25 | 75% |

TABLE 3-continued

| n | r | P(1 ≧ r) | Confidence level (%) that P(r) > 0.5 |
|---|---|---|---|
| 3 | 3 | 0.125 | 87.5% |
| 4 | 4 | 0.0625 | 93.75% |
| 5 | 5 | 0.03125 | 96.88% |
| 6 | 6 | 0.015625 | 98.44% |
| 7 | 7 | 0.0078125 | 99.22% |

As soon as controller 42 reaches, for example, a 90% confidence level that P(r) is greater than 50%, then it adjusts the window center setting in register 44 to the left, thereby tending to equalize P(r) and P(1). In Table 3 above, that would require four successive Shift Right errors to be detected.

In another example, where one error of a different type occurs in this sequence, the following table can be generated.

TABLE 4

| n | r | l | P(1 ≧ r) | Confidence level (%) that P(r) > 0.5 |
|---|---|---|---|---|
| 1 | 1 | 0 | 0.50 | 50% |
| 2 | 1 | 1 | 0.75 | 25% |
| 3 | 2 | 1 | 0.50 | 50% |
| 4 | 3 | 1 | 0.3125 | 68.75% |
| 5 | 4 | 1 | 0.1875 | 81.25% |
| 6 | 5 | 1 | 0.109375 | 89.06% |
| 7 | 6 | 1 | 0.0625 | 93.75% |
| 8 | 7 | 1 | 0.03516 | 96.50% |

In this case, in order to reach a confidence level of 90%, six Shift Right errors must occur while only one Shift Left error occurs.

Practically, it is necessary to set a threshold confidence level in order to keep controller 42 from "hunting" for the optimum level. In one preferred embodiment, a confidence level of 85% is set and another threshold is set whereby at least 3 to 4 errors must be detected before the confidence level is checked. If all errors are of the same type (either Shift Left errors or Shift Right errors), then the confidence level can be immediately extracted. If not, some calculations need to be done. For example, the confidence level that the probability of a Shift Right error occurring is greater than 50% is represented by:

$$P(P(r) > 0.5) = 1 - \sum_{y=r}^{n} \left( \frac{n!}{y!(n-y)!} \right) \left( \frac{1}{2^n} \right) \quad \text{Eq. 4}$$

Similarly, the confidence level that the probability that a Shift Left error will occur is greater than 50% is represented by:

$$P(P(l) > 0.5) = 1 - \sum_{y=l}^{n} \left( \frac{n!}{y!(n-y)!} \right) \left( \frac{1}{2^n} \right) \quad \text{Eq. 5}$$

If the confidence level of either of the above two equations is greater than the threshold confidence level (in this preferred embodiment 85%) then the window center settings are adjusted. If not, no adjustment is made until the threshold confidence level is reached. Alternatively, the maximum number of a certain error type (either Shift Left or Shift Right) can be determined and a confidence level check can be performed on that error type. Then, the appropriate adjustment to the window center setting can be made.

OPERATION OF CONTROLLER 42

Figure 8A:
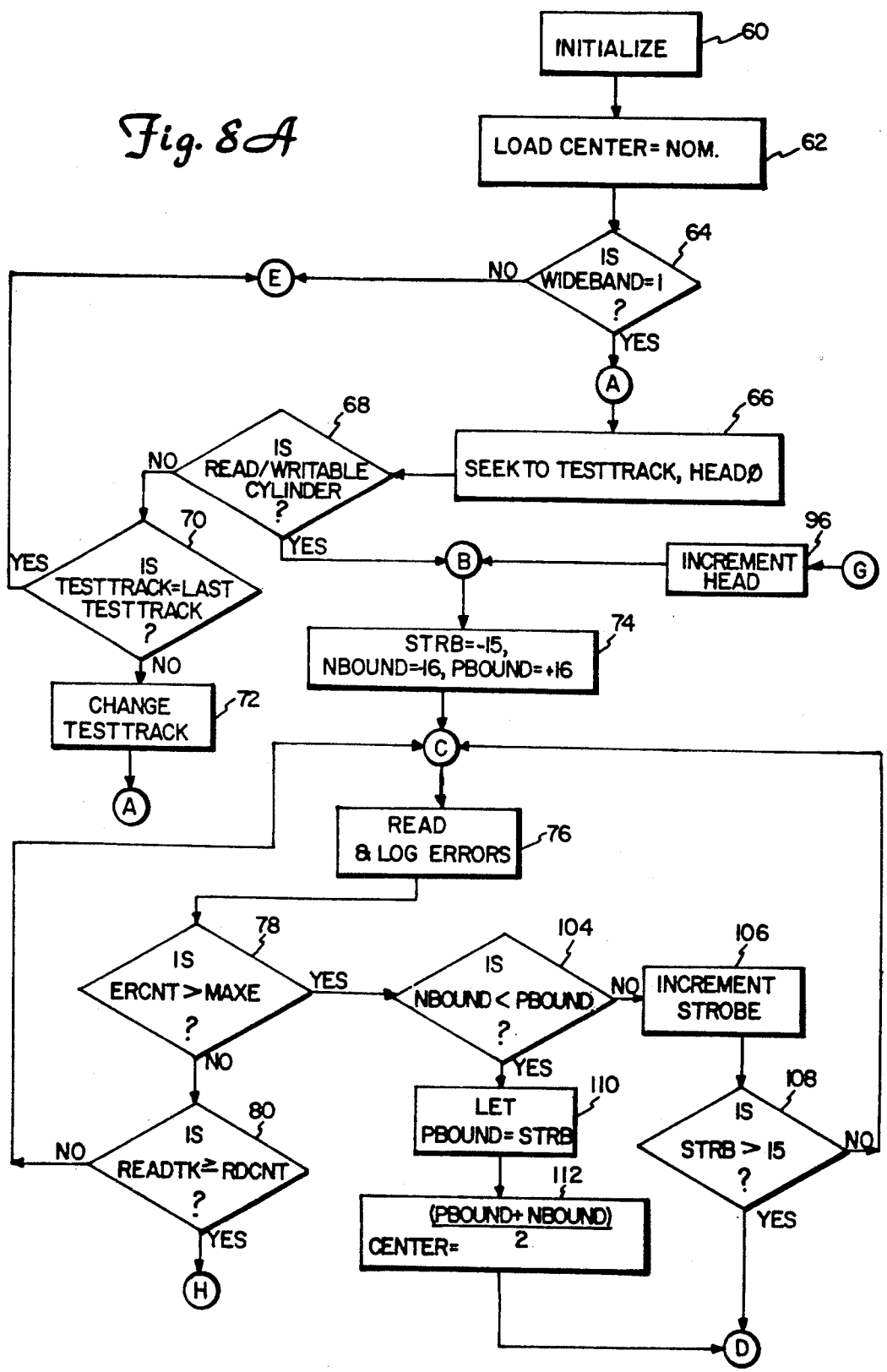
FIGS. 8A, 8B and 8C show a flow diagram representing one embodiment of the window centering technique of the present invention.
Figure 8B:
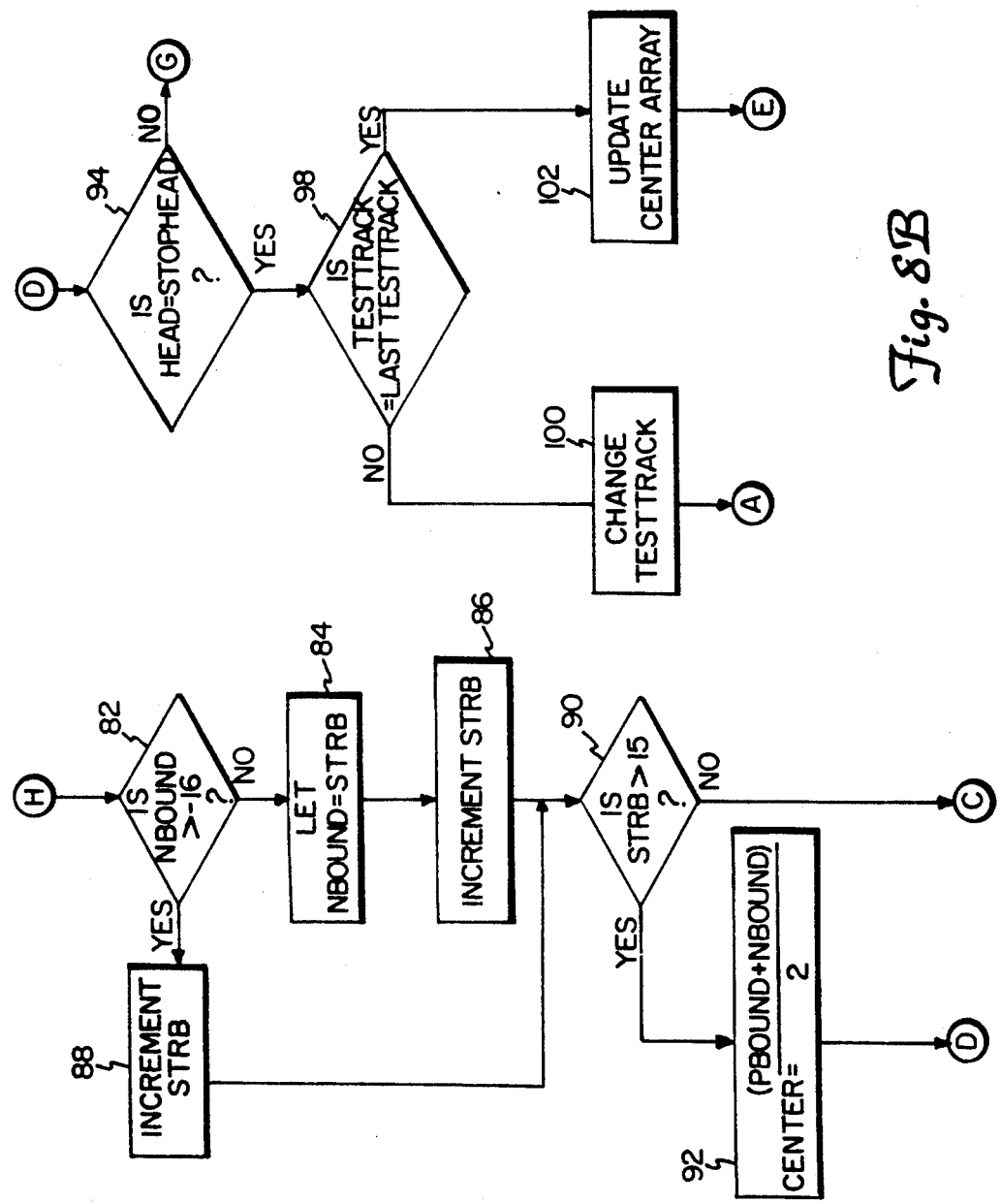
Figure 8C:
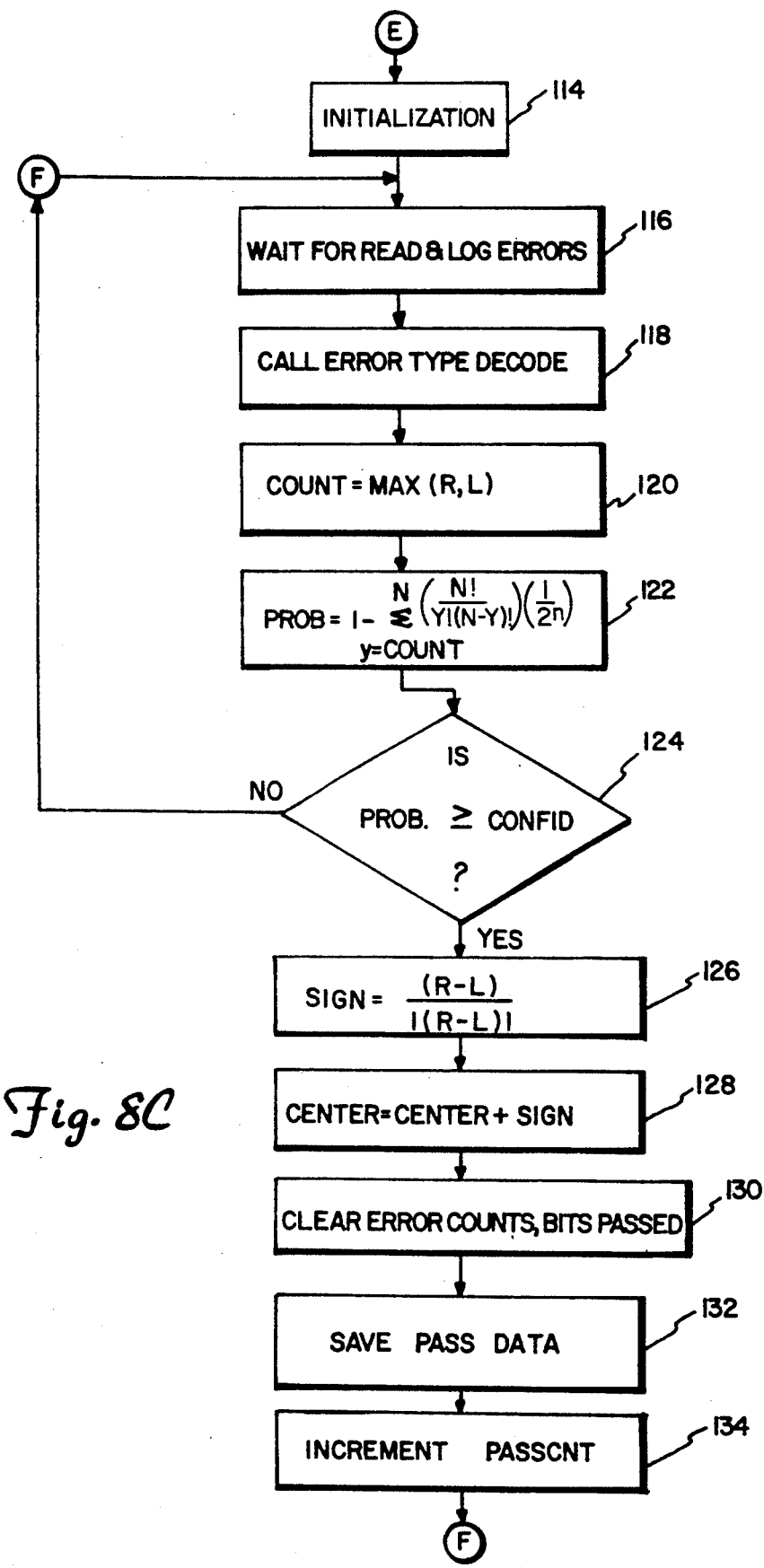

FIGS. 8A, 8B and 8C show a flow diagram illustrating the operation of controller 42 in performing the coarse and fine adjustments to the window center settings in read chain 34. For ease of reference, FIGS. 8A, 8B and 8C should be placed in vertical relationship with one another with FIG. 8A on top and FIG. 8C on the bottom. FIGS. 8A, 8B and 8C, in this preferred embodiment, refer to strobe values. These strobe values correspond to values used with the National Semiconductor 8459 integrated circuit chip. The strobe values vary, in units of percent, between −27% and +27% with 0% corresponding to a nominal strobe value. Therefore, where controller 42 determines that the window center setting must be shifted to the left, the strobe value for the National Semiconductor 8459 integrated circuit chip is moved from, for example, 0% to −1%. Similarly, where controller 42 determines that the window center setting must be shifted to the right, the strobe value on the National Semiconductor 8459 integrated circuit chip is moved, for example, from 0% to 1%, or from 1% to 2%, etc. . . . It will be understood by those skilled in the art that a variety of circuits could be used to perform this function, and the National Semiconductor 8459 is only one preferred embodiment.

In addition, FIGS. 8A, 8B and 8C use the following terms.

CENTER is an array of window center strobe setting values for individual heads (or zones per head). CENTER is loaded with default values upon power up to read various commands for disk drive configuration. Then, CENTER is loaded with a nominal value if coarse tuning is to be performed. If not, CENTER is loaded with stored values of window centers which were stored during previous execution.

RDCNT is a variable representing the maximum number of reads to be performed on a test track.

MAXE is a variable representing the maximum number of errors to allow on a test track.

TESTTRACK is a prestored location on the magnetic disk where the read only test for window center should be performed.

CONFID is a variable representing the confidence level threshold for moving strobe settings (i.e. 85% in this preferred embodiment).

PASSCNT is a variable indicating the number of adjustments made to window center settings-for statistical printout.

STRB is a strobe setting.

NBOUND is the negative boundary of strobe settings during coarse tuning.

PBOUND is the positive boundary of strobe settings during coarse tuning.

ERCNT is the number of errors logged for read operations.

STOPHEAD is a variable indicating coarse tuning has been performed for the last head.

READTK is a variable indicating the number of reads per test track which have been executed.

COUNT is a variable indicating number of errors.

MAX(r,l) is a variable indicating the maximum number of errors of the majority type which have been logged.

SIGN is a variable indicating the direction of correction to be made in adjusting strobe settings.

N is total number Shift Right and Shift Left errors logged.

WIDEBAND is a term used to designate whether the coarse tuning operation should be performed to accelerate window center seeking. It should be noted that the optimum window center setting can be determined using only the fine tuning technique. However, by using the coarse tuning operation, the window center setting can be set more quickly. 0 The coarse tuning routine is initialized and the array CENTER is loaded with nominal values. It should be noted that CENTER could also be loaded with values which were stored during a previous coarse tuning routine. These operations are indicated in blocks 60 and 62. Next, controller 42 determines whether the coarse tuning operation is to be performed. This is indicated in block 64. If not, controller 42 skips to the fine tuning routine. However, if WIDEBAND equals 1 (the coarse tuning technique is to be performed), then controller 42 causes actuator 1B to perform a seek operation for the first head in magnetic disk 10, thereby moving the first head (e.g. head 0) to the test track. This is indicated by block 66.

Next, controller 42 determines whether the particular cylinder over which the selected transducer is flying is a read/writable cylinder. If not, controller 42 determines whether there are any test tracks left to test. If so, the next test track is determined and controller 42 causes actuator 18 to seek to that test track. This is indicated by blocks 68, 70 and 72. If the test track over which the selected transducer is flying is in a read/writable cylinder, then controller 42 sets the strobe value to $-15\%$ and sets the negative boundary to $-16\%$ and the positive boundary to positive 16%. This is indicated by block 74.

Next, the read errors in reading from the selected test track are read and logged. This is indicated by block 76. Then, the total error count is compared to the maximum number of errors allowed per test track. If the total error count is less than the maximum number of errors allowed per test track, then the number of read operations which have been performed for that test track is compared to the maximum number of reads allowed per test track. This is indicated in block 80. If more read operations are required, then controller 42 repeats the steps taken in blocks 76 and 78. This is indicated in block 80.

Next, controller 42 determines whether the negative boundary is greater than $-16\%$. If not, the negative boundary is set to the current strobe value and the strobe value is incremented. This is indicated in blocks 82, 84 and 86. If the negative boundary is greater than $-16\%$, then the strobe value is simply incremented. This in indicated in block 88.

The strobe value is then examined to see whether it is greater than 15. If not, controller 42 returns to operation block 76. If it is, then the CENTER array is set to the center point between the current positive and negative boundaries. This is indicated in blocks 90 and 92. Then, controller 42 determines whether coarse tuning must be performed for any other heads or test tracks in disk drive 10. If so, controller 42 repeats the appropriate steps. If not, controller 42 updates the CENTER array appropriately and moves on to the fine tuning operation. This is indicated in blocks 94, 96, 98, 100 and 102.

In, in block 78, the total number of errors counted during the read operations is greater than the maximum number of errors allowed on the given test track, then the absolute value of the negative boundary is compared with the absolute value of the positive boundary. This is indicated in block 104. If, however, the answer determined in block 78 is NO, then the strobe is incremented and controller 42 determines whether the present value of the strobe is greater than 15. If not, controller 42 returns to block 76. If so, controller 42 goes to block 94.

If in block 104, the absolute value of the negative boundary is less than the absolute value of the positive boundary, then the positive boundary is set to the current strobe value and the CENTER array is set to the midpoint between the positive and negative boundaries. This is indicated in blocks 110 and 112. Then, controller 42 determines whether any other heads or test tracks must be coarsely tuned. If not, controller 42 moves on to the fine tuning operation.

In the fine tuning technique, the strobe value for the National Semiconductor 8459 integrated circuit chip will only be moved in the smallest increments allowed by the integrated circuit chip. Therefore, all that must be determined is whether the confidence level is above the confidence level threshold, and which direction the window center setting must be adjusted.

Once the fine tuning technique is initialized, controller 42 can either wait for a read command, as indicated in block 114, or can exercise the read operation when the drive is idle. Controller 42 exercises the read command by continuously reading test tracks and updating the window center settings. Where power requirements are not critical, the latter technique may be used. However, in this preferred embodiment, block 116 indicates that controller 42 waits for a read command before reading and logging errors.

Once errors are logged, controller 42 determines which type of (i.e. either Shift Left or Shift Right) errors are logged. This is determined, as discussed earlier, by analyzing the read error characteristics as they are read in the 2,7 encoded bit stream. This is indicated in block 118. Next, controller 42 determines the maximum number of Shift Right or Shift Left errors detected and determines the confidence level using the number of errors of the majority type determined. This is indicated in blocks 120 and 122. If the confidence level is less than the confidence level threshold, then controller 42 returns to block 116 to log more error samples. This is indicated in block 124.

However, if the confidence level is greater than or equal to the confidence level threshold, then a window center setting adjustment is required and controller 42 determines the direction in which the adjustment must be made. This is indicated in block 126. Then, the strobe value stored in the CENTER array is updated by moving the appropriate strobe value one unit in the direction determined in block 126. This is indicated in block 128. Next, the error counters are cleared and the CENTER array is written to the magnetic disk so the strobe values stored in the CENTER array can be retrieved as default settings during the next read operation. This is shown in blocks 130, 132 and 134.

Figure 9:
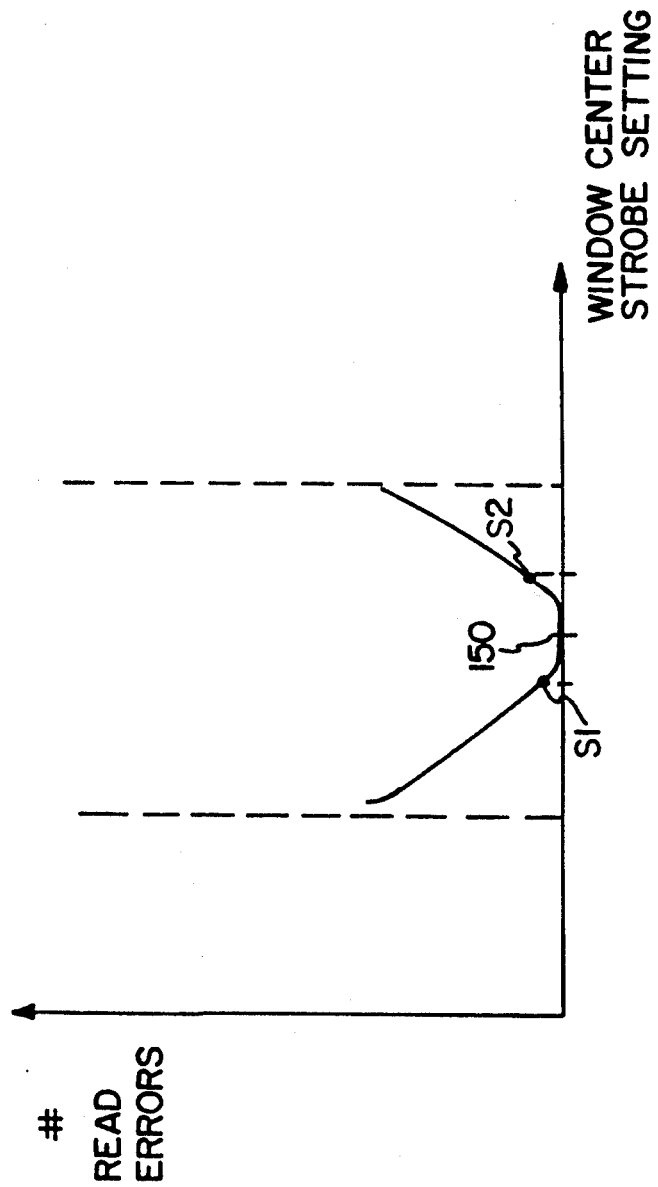
FIG. 9 is a graph showing a number of read errors plotted against window center settings.

FIG. 9 is a graph showing the number of read errors plotted against window center strobe settings. In some cases, it may happen that the integrated circuit chip used to set the window center settings, such as the National Semiconductor 8459 integrated circuit chip, may have center settings which can only be adjusted in increments. Those increments may be too large to hit the exact optimum window center setting, such as 150 shown in FIG. 9. Instead, the two closest strobe settings may be strobe setting S1 and strobe setting S2 which shift the window center around point 150 but never actually reach exactly the optimum window center setting 150. In such a case, instability may exist in disk drive 10 in that controller 42 would continually oscillate the strobe setting in register 44 between points S1 and S2.

Therefore, in this preferred embodiment, controller 42 stores the strobe setting determined during a previous fine tuning operation and also stores the error rate associated with that strobe setting. Then, when controller 42 determines that an adjustment is required, controller 42 determines whether the adjustment will be back to the previous strobe setting. If so, controller 42 determines whether the number of read errors associated with that previous strobe setting are greater or less than the number of read errors associated with the present strobe setting. If they are less, controller 42 makes the desired adjustment If not, controller 42 disregards the adjustments and leaves the strobe settings at the present value.

CONCLUSION

The coarse and fine tuning operations can be performed for each transducer in magnetic disk drive 10. Further, such routines can be performed for a plurality of zones on each magnetic disk 12 in disk drive 10. Therefore, very accurate window center settings can be adjusted for each transducer, magnetic disk and zone in disk drive 10. Furthermore, by using the types of errors detected to indicate the direction of needed correction, a closed loop feedback system is used to adaptively adjust the window center settings.

By continuously updating the window center settings for each head or disk, or zone in disk drive 10, controller 42 can adjust for signal time shifting in read signal 32 caused by temperature variation, aging, voltage variation and timing variations in electronic circuits in disk drive 10. This improves the error rate during read operations and also increases manufacturing yield of disk drives.

In addition, if new printed circuit boards or components must be added to disk drive 12, any timing variations caused by the new components or printed circuit boards is almost immediately adjusted for by using the technique of the present invention.

Although the present invention has been described with reference to preferred embodiments, workers skilled in the art will recognize that changes may be made in form and detail without departing from the spirit and scope of the invention.

What is claimed is:

1. A method of adjusting a window center setting in a read channel of a magnetic disk drive suitable for reading data from a magnetic disk, the method comprising:
    reading data from the magnetic disk by performing a number of read operations;
    detecting a number of first read errors made while reading the data;
    detecting a number of second read errors made while reading the data; and
    adjusting the window center setting based on the number of first read errors detected and the number of second read errors detected.

2. The method of claim 1 wherein the step of detecting a number of first read errors comprises:
    detecting a number of Shift Right read errors during the read operations.

3. The method of claim 2 wherein the step of detecting a number of second read errors comprises:
    detecting a number of Shift Left read errors during the read operations.

4. The method of claim 3 and further comprising:
    determining an adjustment confidence level based on the number of Shift Right read errors detected, the number of Shift Left read errors detected, and a total number of Shift Right and Shift Left read errors detected; and
    comparing the adjustment confidence level with a predetermined confidence level threshold, and performing the step of adjusting the window center setting only if the adjustment confidence level exceeds the predetermined confidence level threshold.

5. The method of claim 3 wherein the step of adjusting the window center setting comprises:
    determining a window center correction value based on the number of Shift Right read errors detected and the number of Shift Left read errors detected; and
    adjusting the window center setting based on the window center correction value.

6. The method of claim 5 wherein the step of determining a window center correction value comprises:
    determining an adjustment direction for adjustment of the window center settings in the read channel based on the number of Shift Right read errors detected and the number of Shift Left read errors detected.

7. The method of claim 6 wherein the step of determining an adjustment direction comprises:
    determining a Shift Right probability based on the number of Shift Right read errors detected, the Shift Right probability representing a probability that a Shift Right read error will be detected during a read operation;
    determining a Shift Left probability based on the number of Shift Left read errors detected, the Shift Left probability representing a probability that a Shift Left read error will be detected during a read operation;
    comparing the Shift Right Probability with the Shift Left probability; and
    determining an adjustment direction based on the comparison of the Shift Right probability with the Shift Left probability, adjustment of the window center setting in the adjustment direction tending to equalize the Shift Right probability and the Shift Left probability.

8. The method of claim 1 and further comprising:
    performing the steps of reading data, detecting a number of first read errors, detecting a number of second read errors, and adjusting the window center setting, on a periodic basis during operation of the magnetic disk drive.

9. A method of adjusting window center settings in a read channel of a magnetic disk drive of the type having a controller for controlling a plurality of transducers suitable for reading data from a plurality of magnetic disks, the window center settings controlling position of a read window during which the controller reads the data from the magnetic disk, the method comprising:
    selecting a transducer corresponding to a desired magnetic disk;
    reading data from the desired magnetic disk by performing a number of read operations;

detecting a number of read errors during the read operations;

recording the number of read errors detected during the read operations;

determining error types for the read errors detected; and controlling adjustment of the window center settings based on the number of read errors detected and the error types determined.

10. The method of claim 9 wherein the step of controlling adjustment of the window center settings comprises:

determining an adjustment confidence level based on the number of read errors detected and the error types determined;

comparing the adjustment confidence level with a confidence level threshold; and adjusting the window center settings based on the number of read errors detected and the error types only if the adjustment confidence level exceeds the confidence level threshold.

11. The method of claim 10 wherein the step of adjusting the window center settings comprises:

determining an updated center position based on the number of read errors detected and the error types; and adjusting the window center settings to the updated center position.

12. The method of claim 11 and further comprising:

storing the window center setting before adjusting the window center settings to the updated center position;

storing an old number of read errors representing the number of read errors recorded before adjusting the window center settings to the updated center position;

recording a new number of read errors detected after the window center settings are adjusted to the updated center position;

determining a new updated center position based on the new number of read errors recorded and new error types; and adjusting the window center settings to the new updated center position only if the new number of read errors is greater than the old number of read errors stored.

13. The method of claim 11 wherein the window center setting has an optimum position, and wherein the step of determining error types comprises:

determining a number of read errors of a first error type having characteristics indicating that the window center setting is shifted in a first direction relative to the optimum position; and determining a number of read errors of a second error type having characteristics indicating that the window center setting is shifted in a second direction relative to the optimum position.

14. The method of claim 13 wherein the step of determining an adjustment confidence level comprises:

determining a first probability, based on the number of first error types detected and the number of second error types detected, representing a probability that a read error of the first error type will occur when reading data;

determining a second probability, based on the number of first error types detected and the number of second error types detected, representing a probability that a read error of the second error type will occur when reading data; and determining the adjustment confidence level based on the first probability, the second probability, and the number of read errors detected.

15. The method of claim 14 wherein the step of adjusting the window center settings to the updated position reduces a difference between the first and second probabilities.

16. The method of claim 9 and further comprising:

repeating the steps of selecting a transducer, reading data, detecting a number of read errors, recording the number of read errors, determining error types, and controlling adjustment of the window center settings, during operation of the magnetic disk drive.

17. The method of claim 9 and further comprising:

repeating the steps of selecting a transducer, reading data, detecting a number of read errors, recording the number of read errors, determining error types, and controlling adjustment of the window center settings, for each selected transducer during operation of the magnetic disk drive.

18. An apparatus for adjusting a window center setting in a read channel of a magnetic disk drive, the magnetic disk drive being suitable for reading data from a magnetic disk, the apparatus comprising:

reading means for reading data from the magnetic disk by performing a number of read operations;

first error detection means, coupled to the reading means, for detecting a number of first read errors during the read operations;

second error detection means, coupled to the reading means, for detecting a number of second read errors during the read operations; and adjustment means, coupled to the first and second error detection means, for adjusting the window center setting based on the number of first read errors detected and the number of second read errors detected.

19. The apparatus of claim 18 wherein the first error detection means comprises:

means for detecting a number of Shift Right read errors made during the read operations.

20. The apparatus of claim 19 wherein the second error detection means comprises:

means for detecting a number of Shift Left read errors made during the read operations.

21. The apparatus of claim 20 and further comprising:

means, coupled to the first and second error detection means, for determining an adjustment confidence level based on the number of Shift Right read errors detected, the number of Shift Left read errors detected, and a total number of Shift Right and Shift Left read errors detected; and means, coupled to the means for determining an adjustment confidence level, for comparing the adjustment confidence level with a predetermined confidence level threshold, the adjustment means adjusting the window center setting only if the adjustment confidence level exceeds the predetermined confidence level threshold.

22. The apparatus of claim 20 wherein the adjustment means for adjusting the window center setting comprises:

means for determining a window center correction value based on the number of Shift Right read errors detected and the number of Shift Left read errors detected; and means, coupled to the means for determining a window center setting, for adjusting the window center setting based on the window center correction value.

23. The apparatus of claim 22 wherein the means for determining a window center correction value comprises:

means for determining an adjustment direction for adjustment of the window center settings in the read channel based on the number of Shift Right read errors detected and the number of Shift Left read errors detected.

24. The apparatus of claim 23 wherein the means for determining an adjustment direction comprises:

means, coupled to the first error detection means, for determining a Shift Right probability based on the number of Shift Right read errors detected, the Shift Right probability representing a probability that a Shift Right read error will be detected during a read operation;

means, coupled to the second error detection means, for determining a Shift Left probability based on the number of Shift Left read errors detected, the Shift Left probability representing a probability that a Shift Left read error will be detected during a read operation;

means, coupled to the means for determining a Shift Right probability and means for determining a Shift Left probability, for comparing the Shift Right probability with the Shift Left probability; and means, coupled to the means for comparing, for determining an adjustment direction based on the comparison of the Shift Right probability with the Shift Left probability, adjustment of the window center setting in the adjustment direction tending to equalize the Shift Right probability and the Shift Left probability.

25. The apparatus of claim 18 and further comprising:

control means for controlling the reading means, the first error detection means, the second error detection means and the adjustment means, for adjusting the window center setting on a periodic basis during operation of the magnetic disk drive.

26. An apparatus for adjusting window center settings in a read channel of a magnetic disk drive of the type having a controller for controlling a plurality of transducers suitable for reading data from a plurality of magnetic disks, the window center settings controlling position of a read window during which the controller reads the data from a magnetic disk, the apparatus comprising:

selection means for selecting a transducer corresponding to a desired magnetic disk;

reading means for reading data from the desired magnetic disk by performing a number of read operations;

read error detection means, coupled to the reading means, for detecting a number of read errors during the read operations;

first storing means, coupled to the read error detection means, for storing the number of read errors detected during the read operations;

error determination means, coupled to the first storing means, for determining error types for the read errors detected; and control means, coupled to the error determination means, for controlling adjustment of the window center settings based on the number of read errors detected and the error types determined.

27. The apparatus of claim 26 wherein the control means comprises:

confidence level determining means for determining an adjustment confidence level based on the number of read errors detected and the error types determined;

a comparator, coupled to the confidence level determining means, for comparing the adjustment confidence level with a confidence level threshold; and a window center adjustor coupled to the comparator, for adjusting the window center settings based on the number of read errors detected and the error types, the window center adjustor adjusting the window center settings only if the adjustment confidence level exceeds the confidence level threshold.

28. The apparatus of claim 27 wherein the window center adjustor comprises:

update means for determining an updated center position based on the number of read errors detected and the error types; and adjustment means, coupled to the update means, for adjusting the window center settings to the updated center position.

29. The apparatus of claim 28 and further comprising;

second storing means, coupled to the update means, for storing the window center setting before adjusting the window center settings to the updated center position;

third storing means, coupled to the first storing means, for storing an old number of read errors representing the number of read errors stored before adjusting the window center settings to the updated center position; and means for determining a new updated center position based on the new number of read errors stored by the first storing means after adjusting the window center settings to the updated center position and new error types determined by the error determination means for the new number of read errors, the adjustment means adjusting the window center settings to the new updated center position only if the new number of read errors is greater than the old number of read errors.

30. The apparatus of claim 28 wherein the window center setting has an optimum position, and wherein the error determination means comprises:

means for determining a first error type having characteristics indicating that the window center setting is shifted in a first direction relative to the optimum position; and means for determining a second error type having characteristics indicating that the window center setting is shifted in a second direction relative to the optimum position.

31. The apparatus of claim 30 wherein the confidence level determining means comprises:

means for determining a first probability based on the number of first error types detected and the number of second error types detected, the first probability representing a probability that a read error of the first error type will occur when reading data;

means, coupled to the means for determining a first probability, for determining a second probability based on the number of first error types detected and the number of second error types detected, the second probability representing the probability that a rear error of the second error type will occur when reading data; and means, coupled to the means for determining a first probability and means for determining a second probability, for determining the adjustment confidence level based on the first probability, the second probability, and the number of rear errors detected.

32. The apparatus of claim 31 wherein the means for adjusting the window center settings to the updated position adjusts the window center settings to reduce a difference between the first and second probabilities.

33. The apparatus of claim 26 wherein the control means further comprises:

means for controlling the selection means, the reading means, the rear error detection means, the first storing means, and the error determination means so that window center settings are adjusted during operation of the magnetic disk drive.

34. The apparatus of claim 26 wherein the control means further comprises:

means for controlling the selection means, the reading means, the read error detection means, the first storing means, and the error determination means so that window center settings are adjusted during operation of the magnetic disk drive to determine a window center setting for each selected transducer during operation of the magnetic disk drive.

* * * * *

UNITED STATES PATENT AND TRADEMARK OFFICE
CERTIFICATE OF CORRECTION

PATENT NO. : 5,146,372

DATED : September 8, 1992

INVENTOR(S) : ROBERT CRONCH, MARK D. HERTZ, HIEU V. NGUYEN

It is certified that error appears in the above-identified patent and that said Letters Patent is hereby corrected as shown below:

Col. 17, line 4, delete "rear", insert "read"

Col. 17, line 10, delete "rear", insert "read"

Col. 18, line 4, delete "rear", insert "read"

Signed and Sealed this

Fifth Day of October, 1993

*Attest:*

BRUCE LEHMAN

*Attesting Officer*   Commissioner of Patents and Trademarks